United States Patent
Schmidt et al.

(10) Patent No.: US 8,088,041 B2
(45) Date of Patent: Jan. 3, 2012

(54) VALVE ARRANGEMENT IN A HYDRAULIC CONTROL UNIT

(75) Inventors: Thilo Schmidt, Meckenbeuren (DE); Christian Popp, Kressbronn (DE)

(73) Assignee: ZF Friedrichshafen AG, Friedrichshafen (DE)

( * ) Notice: Subject to any disclaimer, the term of this patent is extended or adjusted under 35 U.S.C. 154(b) by 326 days.

(21) Appl. No.: 12/561,782

(22) Filed: Sep. 17, 2009

(65) Prior Publication Data

US 2010/0081543 A1 Apr. 1, 2010

(30) Foreign Application Priority Data

Sep. 26, 2008 (DE) .................. 10 2008 042 383

(51) Int. Cl.
*F16H 61/26* (2006.01)
(52) U.S. Cl. .................. 477/164; 477/160; 477/163
(58) Field of Classification Search .................. 477/127, 477/130, 131, 160, 161, 163, 164
See application file for complete search history.

(56) References Cited

U.S. PATENT DOCUMENTS

| 6,024,424 | A  | * | 2/2000  | Nakazawa et al. | 303/116.1 |
| 6,585,228 | B1 | * | 7/2003  | McCaskill       | 251/129.13 |
| 2005/0045237 | A1 | * | 3/2005  | Dean         | 137/625.65 |
| 2007/0187204 | A1 |   | 8/2007  | Gierer et al. | |
| 2010/0300086 | A1 | * | 12/2010 | Buttner et al. | 60/420 |

FOREIGN PATENT DOCUMENTS

| DE | 102006006181 | 8/2007 |
| DE | 102007042207 | 3/2009 |
| WO | 2009030581   | 3/2009 |

* cited by examiner

*Primary Examiner* — Ha D. Ho
(74) *Attorney, Agent, or Firm* — Davis & Bujold, P.L.L.C.

(57) ABSTRACT

A pressure ($p\_3$) setting system (200) with a pressure control valve (1), comprising a valve gate (10) arranged to be displace in a valve bore (12). The valve bore has at least one pressure chamber (21, 22, 23, 24, 25, 26), in which the valve gate may be axially exposed to a pressure. A first pressure chamber (21) is connected to at least one acceleration-dependent compensation member (203) for full or partial compensation of any pressure ($p\_3$) setting disturbances caused by mass forces ($F\_a1, F\_a2$) resulting from the acceleration (a) of the system.

10 Claims, 3 Drawing Sheets

VALVE ARRANGEMENT IN A HYDRAULIC CONTROL UNIT

This application claims priority from German Application Serial No. 10 2008 042 383.1 filed Sep. 26, 2008.

FIELD OF THE INVENTION

The present invention relates to a valve arrangement in a hydraulic or pneumatic circuit, in particular in an electrohydraulic control device for controlling a transmission.

BACKGROUND OF THE INVENTION

The pressure of hydraulic or pneumatic systems is controlled by valves that control the pressure by a modulating movement between at least two axial forces acting against one another. The axial forces result from at least one pressure and a further external force which, for example, are applied by a spring, a solenoid or a second hydraulic pressure to the valve gate.

The constantly increasing demands on the quality and speed of control of hydraulic or pneumatic control systems result in systems that are more and more vulnerable to disturbances. This is due, for example, to the compromise that is required to achieve a high control speed of the valves, because ever smaller valve gates are used which, however, are very vulnerable to disturbances of all sorts (disturbance force/return surface=pressure disturbance) because of their small return surface (gate surface on which the pressure to be modulated is applied). This is particularly the case when the control forces for actuating the valve gate are very small and/or high control pressures have to be reached.

In hydraulic systems which are exposed to acceleration, like motor vehicle transmissions, the force ratios at the valve gates, among others, are influenced by the mass forces resulting from the acceleration. This effect is especially pronounced if the valve gates are arranged with their longitudinal axis, and thus their only translational degree of freedom, in the direction of travel. As a result, the pressure ratios also undesirably change in the hydraulic system. In particular, in electromagnetic pressure controllers designated as a pressure pilot valve, and thus in the pilot-actuated valve gates for controlling the pressure in the start-up clutch, the required values of the pressure to be controlled cannot precisely be maintained in the acceleration phase owing to this disturbance, as a result of which the transmission capacity and performance of the clutch are impaired. This problem is similar in pneumatic systems.

A possible measure to prevent the influence of the longitudinal acceleration is the arrangement of the valve gates which are used for controlling the start-up clutch, as well as possibly available pressure pilot valves with their longitudinal axis perpendicular to the direction of travel. The mass forces resulting from the longitudinal acceleration hereby actuate perpendicularly to the only translational degree of freedom of the valve gate and thus have no influence on the pressure ratios at the valve gates. This perpendicular arrangement of the valve gate is, however, disadvantageous in vehicles that have a drive motor with a crankshaft oriented in the longitudinal direction of the vehicle because the rotational irregularities of the drive motor actuate tangentially to the crankshaft axis, and consequently likewise to the direction of travel, thus influencing the force ratios at the valve gates due to the resultant mass forces. Because of the high motor arrangements and very high accelerations, this in turn affects the pressure settings and may further result in wear and/or destruction of the valve system.

Another known device for solving the problem is an angular pressure regulator. In this case, only the pressure controller which is, for example, configured as an electromagnetic proportional valve, is arranged with its longitudinal axis at an angle of 90° to the longitudinal axis of the valve gate of the pressure control valve, whereby the acceleration of the whole system only acts on the valve gate and the pilot pressure remains unaffected. Here, the disadvantages are the complex production or conditioning and consequent costs, as well as the requirement for a larger installation space.

SUMMARY OF THE INVENTION

The object of the present invention is to create an electrohydraulic system for setting defined pressure ratios whose performance is not affected by the influence of acceleration on the system.

A pressure setting system has a pressure control valve which comprises a valve gate that is arranged to displaced in a valve bore. The valve bore is penetrated by at least one pressure chamber in which the valve gate may be axially impinged with a pressure. According to the present invention, a first pressure chamber is connected to at least one compensation member acting in dependence on acceleration. Through this, it is possible to completely or partially compensate for disturbances in the pressure setting caused by mass forces resulting during the acceleration of the system.

In an especially advantageous embodiment of the present invention, the compensation member comprises a shut-off element which is arranged to displace between a first and at least another connection. In this case, a pressure difference is present between a first and at least another connection. As a result of the effect of the mass force which results from an acceleration of the system, the shut-off element shifts such that the pressure difference decreases by a change in the pressure in the first pressure chamber. The pressure in the first pressure chamber is in this case modified to the extent to which the changes in pressure ratio in the pressure control valve caused by the acceleration are counteracted by their influence on the pressure setting.

In a further development of the subject matter according to the present invention, the compensation member is configured as a pressure limiting valve, as a plate valve, or gate valve, whereby the shut-off element is configured as a cylindrical gate or as a plate.

In an alternative embodiment, the compensation member is configured as a pressure reducing valve, as a gate valve, whereby the shut-off element is configured as a cylindrical gate.

A further embodiment provides that the pressure control valve is configured as a pressure limiting valve.

An alternative embodiment thereto provides that the pressure control valve is configured as a pressure reducing valve.

It is finally considered to be advantageous that the masses of the valve gate and of the shut-off element and/or of the surfaces of the valve gate and of the shut-off element that may be axially impinged with pressure are selected in relation to one another, such that during acceleration of the system the change in pressure in the compensation member resulting from shifting the shut-off element is equal to the deviation of the pressure setting resulting from the effect of the acceleration in the pressure chamber.

In another embodiment, a second pressure chamber is connected to a pressure pilot valve, whereby the pressure impinging on the second pressure chamber may be set by the pressure pilot valve. The pressure pilot valve may for example be configured as an electromagnetic proportional valve.

A hydraulic control device for a transmission advantageously features a pressure setting system according to the present invention.

It is likewise possible that an automatic transmission for a motor vehicle has a pressure setting system according to the present invention.

The operating medium of the system may be fluid as well as gaseous, so that the present invention and its embodiments may be used in hydraulic and pneumatic systems.

BRIEF DESCRIPTION OF THE DRAWINGS

Embodiments of the invention are shown in drawings and will be explained hereinafter in more detail. The drawings show.

DETAILED DESCRIPTION OF THE DRAWINGS

Figure 1:
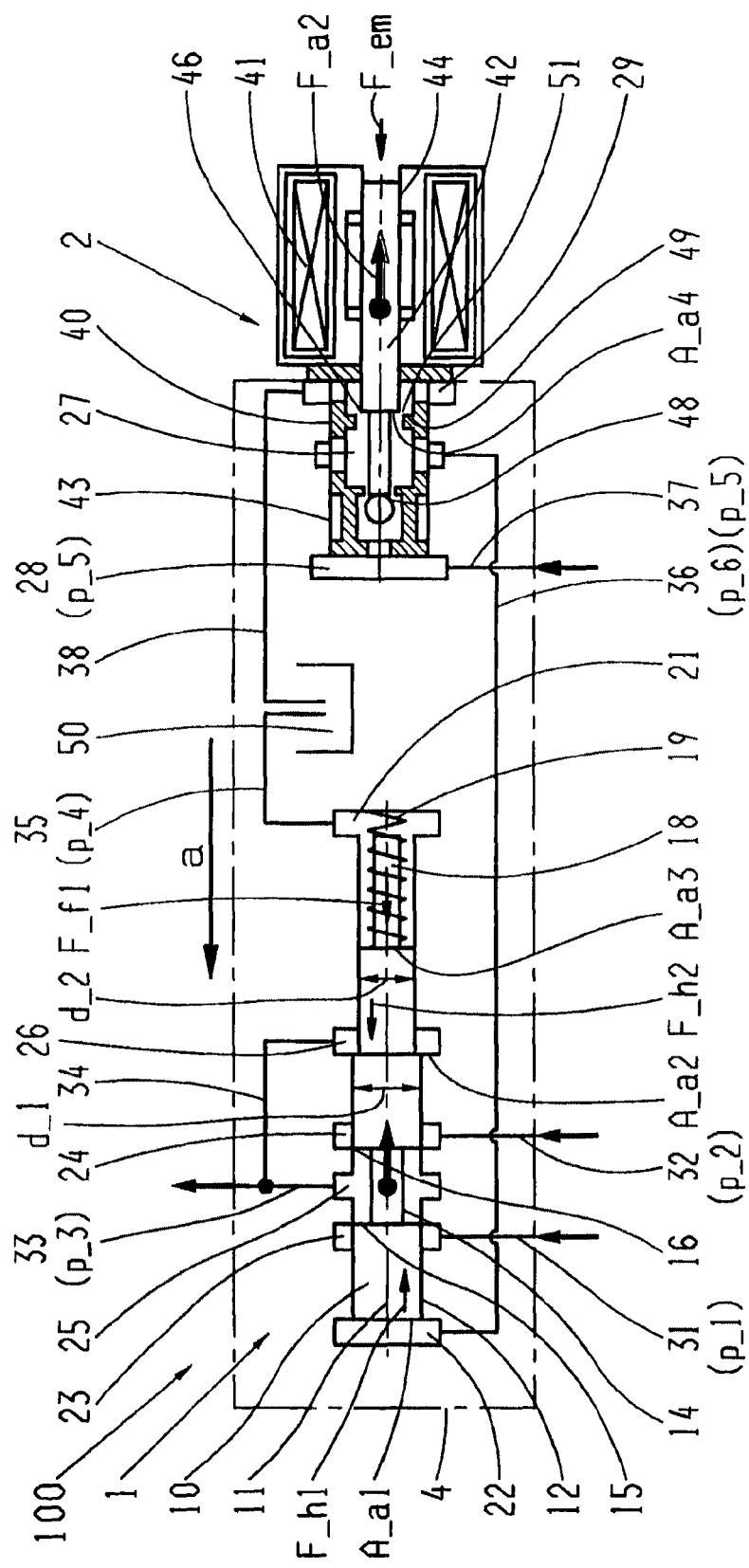
FIG. 1 A prior art pressure setting system.

FIG. 1 shows a prior art pressure setting system 100 which consists of a pressure control valve 1 configured as a pressure reducing valve and a pressure pilot valve 2 configured as an electromagnetic proportional valve. The pressure control valve 1 and pressure pilot valve 2 are arranged in a common valve body assembly 4. The pressure control valve 1 comprises, among others, a valve gate 10 which is movably guided in the direction of its longitudinal axis 11 in a valve bore 12. The cylindrical valve gate 10 with a maximum outer diameter $d\_1$ exhibits a circular axial front surface $A\_a1$ at a first end. A first 15 and a second 16 control edge are formed by means of a reduction in the cross section 14 configured as a groove in the cylindrical outer contour of the valve gate 10. The diameter of the valve gate 10 is reduced to a diameter $d\_2$ in the direction of a second end, as a result of which an annular feedback surface $A\_a2$ is formed at the stepped transition to the diameter $d\_1$. It is again reduced to a cylindrical outer contour having a diameter $d\_3$ in the direction of the right end of the valve gate 10 in the drawing, whereby a cylindrical spring guiding pin 18 is formed. A spring 19 is arranged concentrically around the spring guiding pin 18 which is supported with one side at the valve gate 10 at an annular surface in the stepped transition from the second outer diameter $d\_2$ to the third outer diameter $d\_3$ and with the other side is supported against the wall of a first pressure chamber 21. Through this, the valve gate 10 is prestressed with the front surface $A\_a1$ against the wall of a second pressure chamber 22, when the system is in the switched-off or unpressurized state. A pressure in the first pressure chamber 21 acts on the valve gate 10 via a circular spring-side projection surface $A\_a3$ whose diameter is the second outer diameter $d\_2$.

Apart from the first 21 and the second pressure chamber 22, the valve bore 12 is penetrated by four further pressure chambers. A third pressure chamber 23 is impinged by a first line 31 with a prefilling pressure $p\_1$, and a fourth pressure chamber 24 by a second line 32 with the system pressure $p\_2$, the highest of all described pressures. The prefilling pressure $p\_1$ and the system pressure $p\_2$ are assumed to be constant in this example. A fifth pressure chamber 25 is configured in the valve body assembly 3 between the third 23 and fourth pressure chamber 24, whereby the fifth pressure chamber 25 is connected to the actuator by means of a third line 33, a clutch in this case. During operation, a control pressure $p\_3$ to be controlled by a pressure control valve 1 appears in the fifth pressure chamber 25 and/or third line 33 leading to the clutch. A fourth line 34 which diverts from the third line 33 is connected to a sixth pressure chamber 26, so that the feedback surface $A\_a2$ is impinged with the pressure $p\_3$ to be controlled, and thus the required feedback about the control variable required for controlling the pressure is given. In a prior art system, the first pressure chamber 21 is connected to a transmission sump 50 by means of a fifth line 35, as a result of which a venting pressure $p\_4$ appears in the first pressure chamber 21 which approximately corresponds to the ambient pressure. The second pressure chamber 22 is connected by a sixth line 36 to a seventh pressure chamber 27 which is associated with the pressure pilot valve 2.

The pressure pilot valve 2 consists of a valve housing 40, an electromagnet 41 connected to the valve housing 40, and a pilot piston 42, whereby the valve housing 40 is arranged in a locating bore 43. The pilot piston 42 is arranged to move lengthwise in a guiding bore 44, whereby a second feedback surface $A\_a4$ and a third control edge 46 are formed. The locating bored hole 43 is penetrated by the seventh pressure chamber 27, an eighth 28, and ninth pressure chamber 29, whereby the eighth pressure chamber 28 is fed with the operating medium by a seventh line 37 and impinged with a reducing pressure $p\_5$.

In the operating state of the hydraulic system, a magnetic force $F\_em$ acts on the pilot piston 42, which is shown oriented to the left side in the drawing, in the pressure pilot valve 2 as a function of an electric current which flows through the electromagnet 41. The operating medium which is exposed to the reducing pressure $p\_5$ in the pressure chamber 28 flows through a throttle cross section 48 into the seventh pressure chamber 27. As soon as a third hydraulic force $F\_h3$ which appears due to the effect of a pilot pressure $p\_6$ and of the reduction pressure $p\_5$ on the second feedback surface $A\_a4$ exceeds the electromagnetic force $F\_em$ due to an increase in the pilot pressure $p\_6$, a throttle gap 51 formed by the third control edge 46 and a third housing edge 49 increases and through which part of the operating medium may escape from the seventh pressure chamber 27 into a ninth pressure chamber 29. The ninth pressure chamber 29 is connected to the transmission sump 50 by an eighth line 38, for which reason the pressure of the ninth pressure chamber 29 corresponds to the venting pressure $p\_4$. By means of this control process, the pilot pressure $p\_6$ remains constant for a constant current value. An increase in the electromagnetic force $F\_em$ would move the pilot piston 42 further to the left side. As a result of this, the throttle gap 51 diminishes, and consequently also the discharge of the operating medium through the ninth pressure chamber 29 into the transmission sump 50. The consequence thereof is an increase in the pilot pressure $p\_6$ to a new setting value.

Since the second 22 and seventh pressure chamber 27 are connected to one another by means of a sixth line 36, the pilot pressure $p\_6$ also acts upon the axial front surface $A\_a1$, whereby a first hydraulic force $F\_h1$ appears that acts against the spring force $F\_f1$ of the spring 19 and of a second hydraulic force $F\_h2$, whereby the second hydraulic force $F\_h2$ appears on the feedback surface $A\_a2$ due to the control pressure $p\_3$. Starting from a certain value of the pilot pressure $p\_6$, the valve gate 10 is slid to the right side so that the first control edge 15 overlays a first housing edge 55, and thus the valve gate 10 interrupts the connection between the third pressure chamber 23 and fifth pressure chamber 25. Prior to the interruption, the control pressure p_3 corresponded to the prefilling pressure p_1. According to the shown position of a second housing edge 56, it is now no longer overlaid by the second control edge 16, and the operating medium which is exposed to the system pressure p_2 in the second line 32 flows through the throttle gap formed by the control edge 16 and housing edge 56 and through the fifth pressure chamber 25 reaches into the third line 33, where the control pressure p_3 now sets itself via the equilibrium of the spring force F_f1, the second hydraulic force F_h2, and the first hydraulic force F_h1. If the control pressure p_3 now increases, for example, as a result of processes at the actuator, a clutch in this example, it acts on the feedback surface A_a2 and slides the valve gate 10 to the left side, as a result of which the throttle gap between the control edge 16 and the second housing edge 56 diminishes and the throttle gap between 15 and the first housing edge 55 increases, so that the system pressure p_2 is throttled, and consequently the control pressure p_3 again decreases and adjusts to the target value. In case of a reduction in the control pressure p_3 due to processes at the actuator, the second hydraulic force F_h2 decreases at the feedback surface A_a2, and the valve gate 10 slides in an inverse manner. If the pilot pressure p_6 is now increased at the pressure pilot valve 2, the balance at the valve gate 10 shifts due to the now increased first hydraulic force F_h1 toward a higher control pressure p_3.

By pilot-actuating the pressure control valve 1 by means of the pressure pilot valve 2, it is possible to set any constant control pressures p_3 or courses of the control pressure p_3 over time.

Hydraulic systems of this type as described in the example are also used for controlling the shifting processes in automatic vehicle transmissions. Vehicle transmissions, and thus also the hydraulic systems in them, are exposed to the dynamics of the movement of the vehicle and/or powertrain. Thus, there are mass forces acting on the movable parts of the hydraulic system due to accelerations, for example, due to vehicle accelerations or rotational irregularities in the drive unit. If the system 100 is now accelerated in the direction shown at an acceleration a, the mass forces act in the opposite direction due to inertia. A second mass force F_a2 loads the pilot piston 42 to the right side and thus against the electromagnetic force F_em. As a result, the throttle gap 51 between the third control edge 46 and third housing edge 49 increases, whereby a larger portion of the operating medium flows off to the transmission sump 50 and the pilot pressure p_6 consequently decreases. The first hydraulic force F_h1 decreases with the pilot pressure p_6 which also decreases in the second pressure chamber 22 and thus the control pressure p_3 also decreases. A first mass force F_a1 resulting from the acceleration a acts at the valve gate 10 to the right side against the spring force F_f1 and against the second hydraulic force f_h2, which appears due to the effect of the control pressure p_3 on the feedback surface A_a2. As a result of this, the throttle gap between the second control edge 16 and the second housing edge 56 increases which causes less throttling of the system pressure p_2, and consequently favors an increase in the control pressure p_3. What effect will now prevail and whether the acceleration a will now cause an increase or decrease in the control pressure p_3, depends on the size of the axial front surface 13 and/or the ratio of the axial front surface A_a1 to the feedback surface A_a2, as well as on the masses of the valve gate 10 and of the pilot piston 42. In any case, apart from an incidental compensation, a deviation of the control pressure p_3 from the desired target value is the effect of the influence of the acceleration. Owing to the opposite influences, it is, however, possible to achieve a compensation of the influences on the control pressure p_3 for a certain acceleration by an adequate selection of the ratios of the masses of the valve gate 10 and pilot piston 42, as well as of the axial front surface A_a1 and feedback surface A_a2 and/or their ratios to one another. This example also shows a fundamental influence of the arrangement of the pressure control valve 1 and/or pressure pilot valve 2. If, for example, the pressure control valve 1 with the pressure chamber 21 pointed in the other direction of the lengthwise direction, the first mass force F_a1 would act in the same direction as the influence of the reduction in the pilot pressure p_3 and thus basically exclude a compensation. The pressure pilot valve 2 would hereby have to be arranged pointing in another direction so that the pilot pressure p_3 could increase under the effect of the acceleration.

Figure 2:
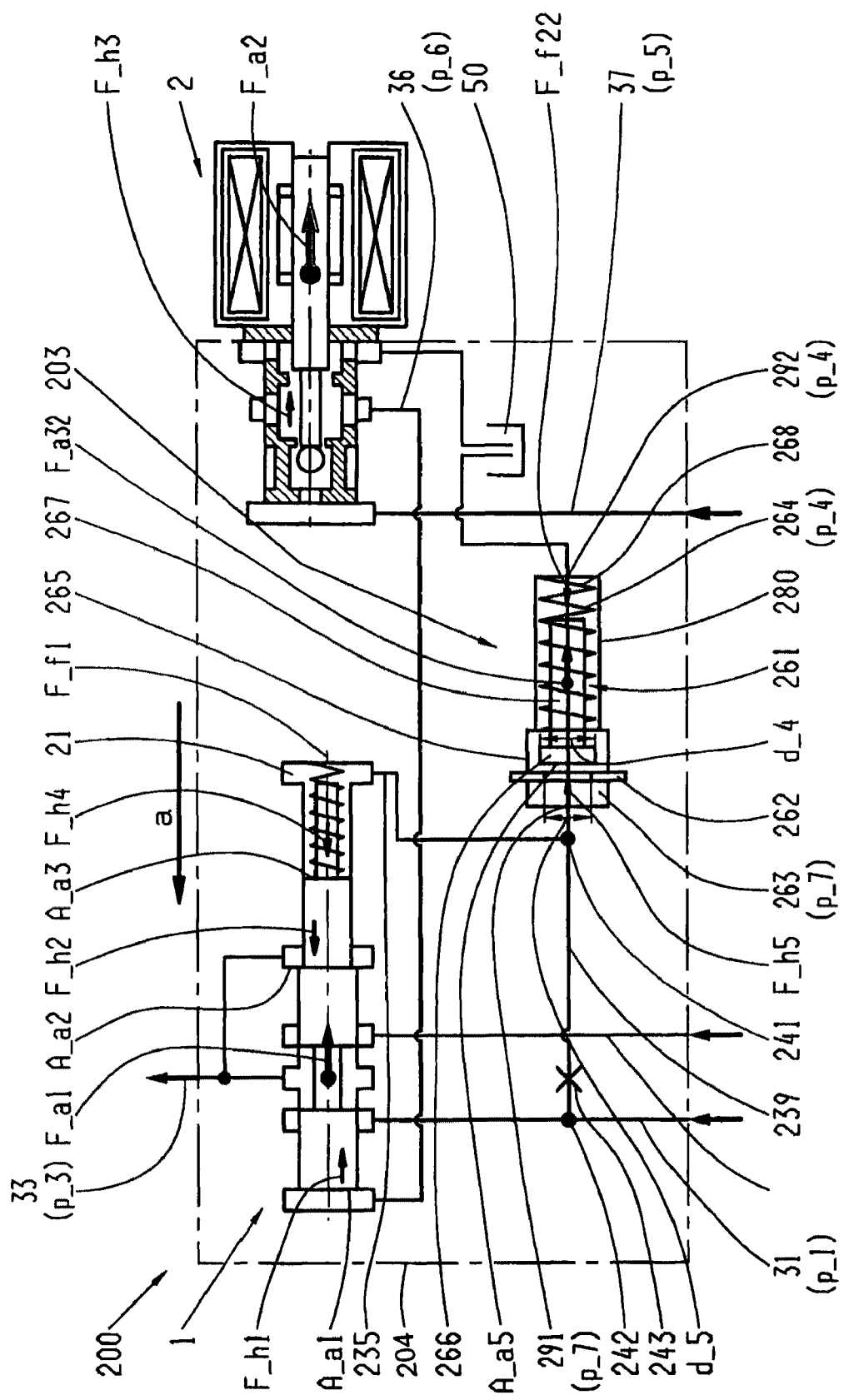
FIG. 2 A system according to the present invention with a compensation member configured as a pressure limiting valve and FIG. 3 A system according to the present invention with a compensation member configured as a pressure reducing valve.

FIG. 2 shows a system 200 according to the present invention for setting a control pressure p_3. It consists of a pressure control valve 1, the pressure pilot valve 2 connected to it, and a compensation member 203. The configuration and interaction of the pressure control valve 1 and the pressure pilot valve 2 in the stationary as well as accelerated state was described in FIG. 1 as the prior art. In addition, the compensation member 203 is arranged in the system for partially or fully compensating the influences of the acceleration in a valve body assembly 204. The compensation member 203 is configured as a pressure limiting valve in the example, and consists of a shut-off element 261 prestressed by a shut-off element spring 268, a first connection 291, a second connection 292 and a valve seat 262. The shut-off element 261 in this case comprises a cylindrical valve plate 266 with a fourth outer diameter d_4 and a second spring guiding pin 267 that is reduced in diameter compared to that of the valve plate 266. The shut-off element 261, the valve seat 262, and the shut-off element spring 268 are in this case arranged inside an inner contour 280 which is configured in the valve body assembly 204. The shut-off element spring 268 is arranged concentric around the second spring guiding pin 267 at the shut-off element 261. In the installed state, the shut-off element spring 268 is supported against the inner contour 280 and presses the cylindrical valve plate 266 of the shut-off element 261 against the valve seat 262, whereby it is closed. The valve seat 262 has an inner diameter d_5 that is smaller than the fourth outer diameter d_4 of the valve plate 266. The second connection 292 is connected to the transmission sump 50 and is thus exposed to the venting pressure p_4.

Unlike the prior art, the first pressure chamber 21 associated with the control valve 1 is not connected to the transmission sump 50, but connected by a fifth line 235 via a first diversion 241 both to the first connection 291 of the compensation member 203 as well as by a ninth line 239 at a second diversion 242 with the first line 31 which is impinged with the prefilling pressure p_1. Through this, the first pressure chamber 21 is also exposed to the prefilling pressure p_1 in the non-accelerated state. The ninth line 239 exhibits a narrowing between the first 241 and second diversion 242 which is, for example, configured as a diaphragm 243.

In the stationary, i.e. non-accelerated, driving state, an equilibrium appears at the valve gate 10 which defines the control position of the first 15 and second control edge 16 relative to the first 55 and second housing edge 56 and thus the amount of control pressure p_3. In the drawing, a first hydraulic force F_h1 which is the product of the pilot pressure p_6 and axial front surface A_a1 acts on the valve gate 10 to the right side. The spring force F_f1 and the second hydraulic force F_h2 at the feedback surface A_a2 act to the left side, as well as additionally a fourth hydraulic force F_h4 which results from a spring chamber pressure p_7 in the first pressure chamber 21 that acts on the spring-side projection surface A_a3 at the valve gate 10. The spring chamber pressure p_7 is equal to the prefilling pressure p_1 owing to the connection of the pressure chamber 21 to the first line 31 via the fifth 235 and ninth line 239. The spring chamber pressure p_7 also acts via the first connection 291 on the circular valve seat surface A_a5 whose diameter is equal to the inner diameter d_5. This results in a fifth hydraulic force F_h5 which loads the shut-off element 261 against the force of a shut-off element spring F_f2. The fifth hydraulic force F_h5 is smaller than the force of the shut-off element spring F_f2.

If the pilot pressure p_6 now decreases in the second pressure chamber 22 due to the acceleration a, the equilibrium as described in FIG. 1 is disturbed. The first hydraulic force F_h1 decreases with the pilot pressure p_6, and thus also the control pressure p_3. The second hydraulic force F_h2, likewise, decreases with the control pressure p_3. According to its spring characteristic, the spring force F_f1 decreases to the left side during the displacement of the valve gate 10. Under the assumption that the first mass force F_a1 resulting from the acceleration which counteracts the effect of the decrease in the first hydraulic force F_h1 cannot increase the control pressure p_3 to the same extent, and thus cannot fully compensate the reduction in the pilot pressure p_6, a control pressure p_3 appears which is below the desired initial value.

The acceleration a also influences the compensation member 203 as mass force which acts as a third mass force F_a32 directed to the right side toward the shut-off element 203 and loads it together with the fifth hydraulic force F_h5 against the force of the shut-off element spring F_f22. Starting from a certain acceleration a, the third mass force F_a32 and the fifth hydraulic force F_h5 exceed the prestressing force of the shut-off element spring 268, and the compensation member 203 configured as a pressure limiting valve opens the valve seat surface A_a5. At this moment, the spring chamber pressure p_7 and the prefilling pressure p_1 are still the same.

After removing the valve plate 266 from the valve seat 262, a throttle gap forms between both elements and thus a connection affected by pressure loss between the first connection 291 and the second connection 292, whereby the venting pressure p_4 is applied to the second connection 292. On account of the pressure difference between the spring chamber pressure p_7 still at the height of the prefilling pressure p_1 and the venting pressure p_4, a portion of the operating medium flows from the fifth line 235 into the transmission sump 50, as a result of which the spring chamber pressure p_7 in the first pressure chamber 21 drops and is no longer equal to the prefilling pressure p_1. The diaphragm 243 prevents a feedback effect of the pressure drop in the fifth line 235 on the prefilling pressure p_1. Owing to the decrease in the spring chamber pressure p_7 in the first pressure chamber 21, the fourth hydraulic force F_h4 decreases and equalizes the effect by the acceleration-induced drop in the pilot pressure p_6 to the control pressure p_3.

The design of the system with regard to a compensation of influences of acceleration by the compensation member 203 requires an adjustment of the surfaces impinged with pressure, of the masses of the valve gate 10, pilot piston 42, and shut-off element 261, as well as of the spring constants and prestressing forces of the springs 19 and 268 for certain acceleration values. Moreover, the arrangement and design of the compensation member 203 depend on the arrangement of the pressure control valve 1 and of the pressure pilot valve 2 against or in the direction of acceleration.

Figure 3:
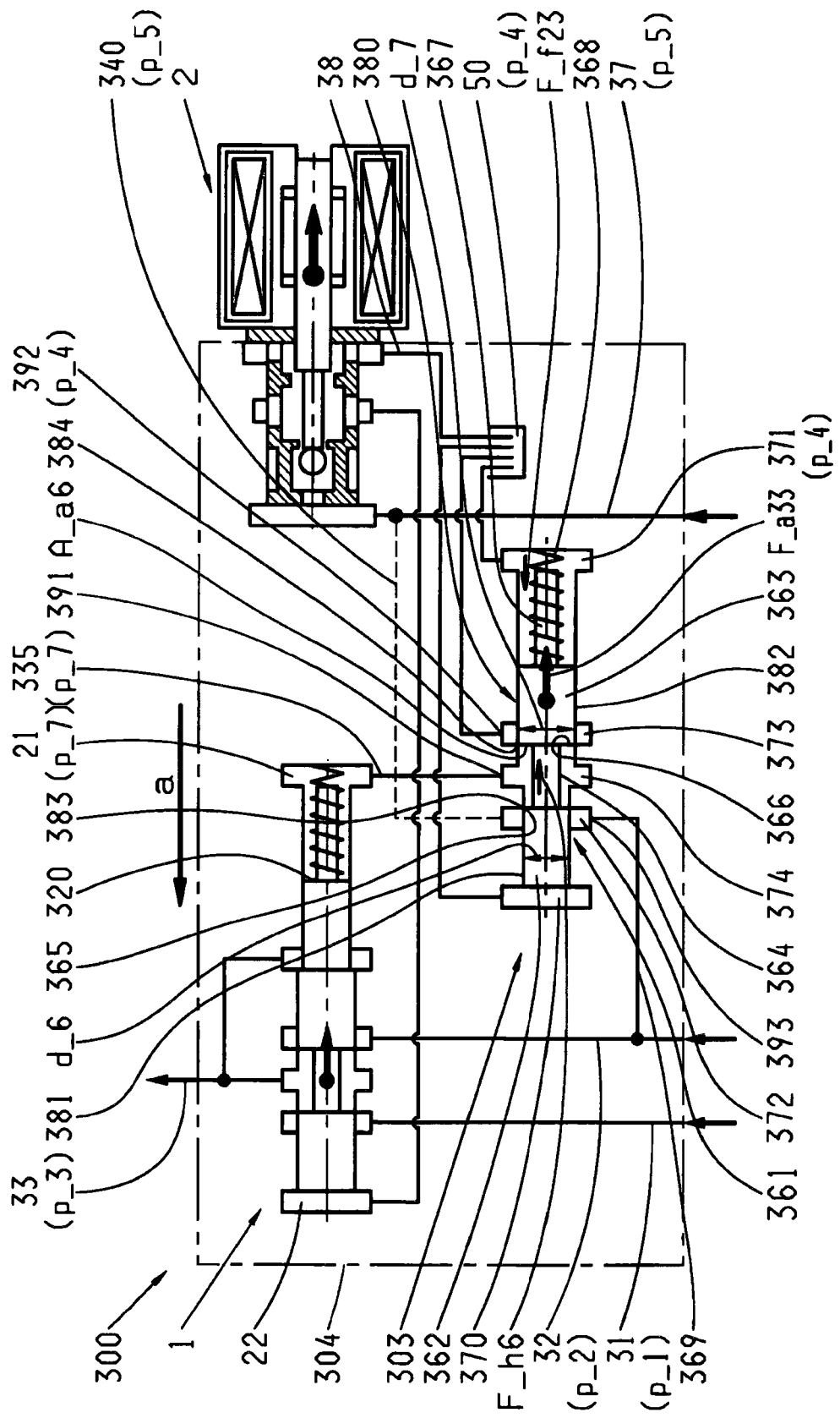

FIG. 3 schematically shows a system 300 according to the present invention for setting a controlled pressure. It comprises the pressure control valve 1, the pressure pilot valve 2 connected to it, and a compensation member 303 which is configured as a pressure reducing valve. The pressure reducing valve comprises a shut-off element 361 which is configured in the form of a stepped piston. The stepped piston consists of a first cylindrical piston section 362 with a first piston section diameter d_6 and a second piston section 363 with a second piston section diameter d_7 which is larger than the first piston section diameter d_6. Between the first 362 and second piston section 363, a fourth 365 and fifth control edge 366 are formed as a groove by a second cross section reduction 364. In addition, the second cross section reduction 364 configures two opposing axial annular surfaces at both piston sections 362 and 363, whereby an axial annular surface exhibits a first piston section diameter d_6 on the first piston section 362 and an opposite axial annular surface exhibits a second piston second diameter d_7 on a second piston section. The differential annular surface between both annular surfaces on the second piston section 363 forms a third feedback surface A_a6. A second spring guiding pin 367 is configured on the other side of the second piston section 363.

A stepped bore 380 is configured in the valve body assembly 304 which has a first 381 and second bore section 382. The first piston section 362 is guided in the first bore section 381, and the second piston section 363 of the stepped bore is movably guided lengthwise in the second bore section 382. The stepped bore 380 is penetrated by several pressure chambers, whereby a tenth pressure chamber 370 is configured at the first end of the stepped bore 380 and an eleventh pressure chamber 371 is configured at the second end which are both connected to the transmission sump 50. In the region of the first bore section 381, the stepped bore 380 is penetrated by a twelfth pressure chamber 372 which is connected to the second line 32 by a third connection 393 and a ninth line 339 connected to it and therefore exposed to the system pressure p_2. Alternatively, the twelfth pressure chamber 372 could also be connected to the seventh line 37 via a tenth line 340 (interrupted line), as a result of which the twelfth pressure chamber 372 would be exposed to the reduction pressure p_5. The second bore section 382 is penetrated by a thirteenth pressure chamber 373 which is connected to the transmission sump 50 by a second connection 392 and thus connected to the venting pressure p_4. A fourteenth pressure chamber 374 is configured between the twelfth pressure chamber 372 and the thirteenth pressure chamber 373 in the transition from the first 381 to the second bore section 382, said fourteenth pressure chamber 374 being connected to the first pressure chamber 21 of the pressure control valve 1 by a first connection 391 and a fifth line 335 connecting to it. The twelfth pressure chamber 372 forms a third housing edge 383 and the thirteenth pressure chamber 373 a fourth housing edge 384 together with the valve body assembly 304. A shut-off element spring 368 is concentrically arranged around the second spring guiding pin 367 which is supported in the installed state on a wall of the eleventh pressure chamber 371 and prestresses the stepped piston 361 against a wall of the tenth pressure chamber 370.

During stationary, i.e. non-accelerated, operation, states of equilibrium as described in FIG. 2 appear at the pressure control valve 1 and at the pressure pilot valve 2. Unlike the system 200 described in FIG. 2, the spring chamber pressure p_7 in the first pressure chamber 21 of the pressure control valve 1 is, however, not generated by means of a diversion of the prefilling pressure p_1, but controlled by the compensation member 303 acting as a pressure reducing valve in the below described manner.

In the turned-off state of the system 300, the shut-off element spring 368 presses the stepped piston 361 to the left side against a wall of the tenth pressure chamber 370 so that the thirteenth pressure chamber 373 is closed by the second piston section 382 toward the fourteenth pressure chamber 374, and the twelfth pressure chamber 372 is connected to the fourteenth pressure chamber 373 and/or the third connection 393 is connected to the first connection 391. When the system is switched on with its effect on the third feedback surface A_a6, the system pressure p_2 generates a feedback pressure force F_h6 which is directed against a force of the shut-off element spring F_f23 of the shut-off element spring 368. In this state of equilibrium, the fourth control edge 365 and the third housing edge 383 form a throttle gap, as a result of which the system pressure p_2 is reduced to the spring chamber pressure p_7. During further in-flowing of the operating medium through the ninth line 339 and the fifth line 335 into the first pressure chamber 21 and the fourteenth pressure chamber 374, the spring chamber pressure p_7 will increase and displace the stepped piston such that the fifth control edge 366 and the fourth housing edge 384 form a throttle gap through which part of the operating medium discharges into the transmission sump 50, and thus the spring chamber pressure p_7 again decreases to its desirable value. By means of this continuous control process, the spring chamber pressure p_7 is kept at a constant value.

If the system is now accelerated in the direction shown by an acceleration a, this acts on the pressure pilot valve 2 as described in FIG. 1 and FIG. 2, whereby the control pressure p_3 changes at the pressure control valve 1. The acceleration a acts as a third mass force F_a33 on the stepped piston 361 and presses it out of its control position to the right against the force of the shut-off element spring F_f23. This reduces the throttle gap between the fourth control edge 365 and the third housing edge 383, and increases the throttle gap between the fifth control edge 366 and the fourth housing edge 384, as a result of which the fifth line 335 and/or the first connection 391 is connected to the second connection 392 and/or transmission sump 50 with the venting pressure p_4 acting therein via a flow resistance in the throttle gap that depends on the mass force F_a33. This reduces the spring chamber pressure p_7 in the first pressure chamber 21 and thus compensates the effect of the pilot pressure p_6 reduced owing to the acceleration a in the second pressure chamber 22 so that the control pressure p_3 is kept at its desired target value. Starting from a certain value of the third mass force F_a33 compared to the force of the shut-off element spring F_f23, the twelfth pressure chamber 372 is completely closed by the first piston section 362 and the fourteenth 374 and thirteenth pressure chamber 373 and/or the first 391 and second connection 392 are connected to one another without a throttling effect so that the spring pressure chamber p_7 is equal to the venting pressure p_4.

An increase in the spring chamber pressure p_7 would also be possible in this embodiment of the compensation member 361 as a pressure reducing valve, in the event the influence of the acceleration were to increase the pilot pressure p_6.

The compensation of the acceleration-induced pressure disturbance allows the arrangement of the pressure control valve 1 and pressure pilot valve 2 with the longitudinal axis 11 in the direction of travel and/or direction of acceleration without negative consequences for the control behavior of the pressure p_3 settings.

REFERENCE CHARACTERS

1. Pressure control valve
2. Pressure pilot valve
4. Valve body assembly
10. Valve gate
11. Longitudinal axis
12. Valve bore
14. Cross section reduction
15. First control edge
16. Second control edge
18. Spring guiding pin
19. Spring
21. First pressure chamber
22. Second pressure chamber
23. Third pressure chamber
24. Fourth pressure chamber
25. Fifth pressure chamber
26. Sixth pressure chamber
27. Seventh pressure chamber
28. Eighth pressure chamber
29. Ninth pressure chamber
31. First line
32. Second line
33. Third line
34. Fourth line
35. Fifth line
36. Sixth line
37. Seventh line
38. Eighth line
40. Valve housing
41. Electromagnet
42. Pilot piston
43. Locating bore hole
44. Guiding bored hole
46. Third control edge
48. Throttle cross section
49. Third housing edge
50. Transmission sump
51. Throttle gap
55. First housing edge
56. Second housing edge
200. Pressure setting system
203. Compensation member
204. Valve body assembly
235. Fifth line
239. Ninth line
241. First diversion
242. Second diversion
243. Diaphragm
261. Shut-off element
262. Valve seat
266. Valve plate
267. Second spring guiding pin
268. Shut-off element spring
280. Inner contour
291. First connection
292. Second connection
300. Pressure setting system
303. Compensation member
304. Valve body assembly
335. Fifth line
339. Ninth line
340. Tenth line
361. Shut-off element
362. First piston section
363. Second piston section
364. Second cross section reduction
365. Fourth control edge
366. Fifth control edge
367. Second spring guiding pin
368. Shut-off element spring 370. Tenth pressure chamber
371. Eleventh pressure chamber
372. Twelfth pressure chamber
373. Thirteenth pressure chamber
374. Fourteenth pressure chamber
380. Stepped bore
381. First bore section
382. Second bore section
383. Third housing edge
384. Fourth housing edge
391. First connection
392. Second connection
393. Third connection
$A\_a1$ Axial front surface
$A\_a2$ Feedback surface
$A\_a3$ Spring-side projection surface
$A\_a4$ Second feedback surface
$A\_a5$ Valve seat surface
$A\_a6$ Third feedback surface
$d\_1$ First outer diameter
$d\_2$ Second outer diameter
$d\_3$ Third outer diameter
$d\_4$ Fourth outer diameter
$d\_5$ Inner diameter valve seat
$d\_6$ First piston section diameter
$d\_7$ Second piston section diameter
$F\_a1$ First mass force (pressure control valve)
$F\_a2$ Second mass force (pressure pilot valve)
$F\_a32$ Third mass force (seat valve)
$F\_a33$ Third mass force (pressure reducing valve)
$F\_em$ Electromagnetic force
$F\_f1$ Spring force
$F\_f22$ Force of the shut-off element spring (seat valve)
$F\_f23$ Force of the shut-off element spring (pressure reducing valve)
$F\_h1$ First hydraulic force
$F\_h2$ Second hydraulic force
$F\_h3$ Third hydraulic force
$F\_h4$ Fourth hydraulic force
$F\_h5$ Fifth hydraulic force
$F\_h6$ Feedback pressure force
$p\_1$ Prefilling pressure
$p\_2$ System pressure
$p\_3$ Control pressure
$p\_4$ Venting pressure
$p\_5$ Reduction pressure
$p\_6$ Pilot pressure
$p\_7$ Spring chamber pressure (first pressure chamber 21)

The invention claimed is:

1. A pressure ($p\_3$) setting system (100, 200, 300) with a pressure control valve (1), the system comprising:
a valve gate (10) being arranged to be displaced within a valve bore (12), the valve bore (12) being penetrated by at least one pressure chamber (21, 22, 23, 24, 25, 26), and the valve gate (10) being axially impinged by a pressure ($p\_1$, $p\_2$, $p\_3$, $p\_4$, $p\_6$), and
a first pressure chamber (21) being connected to at least one acceleration-dependent compensation member (203, 303) for either fully or partially equalizing pressure ($p\_3$) setting disturbances caused by mass forces ($F\_a1$, $F\_a2$) resulting from acceleration (a) of the system.

2. The system according to claim 1, wherein a displaceable shut-off element (261, 361) is arranged in the compensation member (203, 303) between a first connection (291, 391) which is connected to the first pressure chamber (21) and to at least a second connection (292, 392, 393), a pressure difference is present between the first and the second connections and the shut-off element (261, 361) is displacable by a third mass force ($F\_a32$, $F\_a33$) having an effect of reducing the pressure difference, and thus of changing the pressure ($p\_7$) in the first pressure chamber (21), to the extent that the change in pressure in the first pressure chamber acts against the influence of the acceleration on the pressure ($p\_3$) settings.

3. The system according to claim 2, wherein the compensation member (203) is a pressure limiting valve of a plate valve type or a gate valve type, and the shut-off element (261) is a cylindrical gate or a plate (266).

4. The system according to claim 2, wherein that the compensation member (303) is a pressure reducing valve of a gate valve type, and the shut-off element (361) is a cylindrical gate or a plate (362, 363).

5. The system according to claim 1, wherein the pressure control valve (1) is a pressure limiting valve.

6. The system according to claim 1, wherein the pressure control valve (1) is a pressure reducing valve.

7. The system according to claim 2, wherein at least one of masses of the valve gate (10) and of the shut-off element (261, 361) and surfaces ($A_{13}a1$, $A\_a2$, $A\_a3$, $A\_a5$, $A\_a6$) of the valve gate and the shut-off element that are impinged with pressures, and characteristics of a shut-off element spring (268, 368) are selected relative to one another such that, with acceleration (a) of the system, the change in pressure in the compensation member (203, 303), caused by displacement of the shut-off element, is equal to deviation of the pressure ($p\_3$) setting in the first pressure chamber (21) resulting from the acceleration.

8. The system according to claim 1, wherein a second pressure chamber (22) is connected to a pressure pilot valve (2), and pressure impinging on the second pressure chamber (22) is set by the pressure pilot valve.

9. A hydraulic control device for a transmission in combination with pressure ($p\_3$) setting system (100, 200, 300) with a pressure control valve (1), the system comprising:
a valve gate (10) being arranged to be displaced within a valve bore (12), the valve bore (12) being penetrated by at least one pressure chamber (21, 22, 23, 24, 25, 26), and the valve gate (10) being axially impinged by pressure ($p\_1$, $p\_2$, $p\_3$, $p\_4$, $p\_6$), and
a first pressure chamber (21) being connected to at least one acceleration-dependent compensation member (203, 303) for either fully or partially equalizing pressure ($p\_3$) setting disturbances caused by mass forces ($F\_a1$, $F\_a2$) resulting from acceleration (a) of the system.

10. An automatic transmission for a motor vehicle in combination with pressure ($p\_3$) setting system (100, 200, 300) with a pressure control valve (1), the system comprising:
a valve gate (10) being arranged to be displaced within a valve bore (12), the valve bore (12) being penetrated by at least one pressure chamber (21, 22, 23, 24, 25, 26), and the valve gate (10) being axially impinged by pressure ($p\_1$, $p\_2$, $p\_3$, $p\_4$, $p\_6$),
a first pressure chamber (21) being connected to at least one acceleration-dependent compensation member (203, 303) for either fully or partially equalizing pressure ($p\_3$) setting disturbances caused by mass forces ($F\_a1$, $F\_a2$) resulting from acceleration (a) of the system.

* * * * *